United States Patent
Wang et al.

(10) Patent No.: US 11,003,224 B2
(45) Date of Patent: May 11, 2021

(54) CONTROL METHOD FOR TERMINAL, TERMINAL, INTELLIGENT WEARABLE DEVICE, AND SYSTEM

(71) Applicant: Huawei Technologies Co., Ltd., Shenzhen (CN)

(72) Inventors: Baicai Wang, Beijing (CN); Quancheng Han, Shenzhen (CN); Guoqiao Chen, Beijing (CN); Qiuyang Wei, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 127 days.

(21) Appl. No.: 16/097,130

(22) PCT Filed: Aug. 25, 2017

(86) PCT No.: PCT/CN2017/099186
§ 371 (c)(1),
(2) Date: Oct. 26, 2018

(87) PCT Pub. No.: WO2018/036565
PCT Pub. Date: Mar. 1, 2018

(65) Prior Publication Data
US 2019/0317563 A1    Oct. 17, 2019

(30) Foreign Application Priority Data
Aug. 26, 2016   (CN) .......................... 201610738550.2

(51) Int. Cl.
*H04M 1/66*   (2006.01)
*H04M 1/68*   (2006.01)
(Continued)

(52) U.S. Cl.
CPC ............ *G06F 1/1694* (2013.01); *G06F 1/163* (2013.01); *G06F 1/3215* (2013.01); *G06F 1/3231* (2013.01)

(58) Field of Classification Search
CPC ......... H04W 4/027; H04W 4/06; H04W 4/40; H04W 12/06
(Continued)

(56) References Cited

U.S. PATENT DOCUMENTS 9,679,487 B1 *   6/2017   Hayward ................ G01S 19/50
9,996,109 B2 *   6/2018   Carceroni ............... G06F 1/163
(Continued)

FOREIGN PATENT DOCUMENTS

CN   103197839 A   7/2013
CN   103885584 A   6/2014
(Continued)

OTHER PUBLICATIONS

Machine Translation and Abstract of Chinese Publication No. CN104915120, Sep. 16, 2015, 21 pages.
(Continued)

*Primary Examiner* — Joseph Arevalo
(74) *Attorney, Agent, or Firm* — Conley Rose, P.C.

(57) ABSTRACT

In a control method relating to the field of electronic device control technologies, and in particular, to a technology for controlling terminal state switching, when receiving a state switching instruction in a lock screen state, a terminal obtains motion data within a predetermined time period of the terminal and an intelligent wearable device bound to the terminal. When a deviation between two groups of motion data is less than a deviation threshold, the terminal performs state switching. The terminal state switching is implemented (Continued)

through cooperation of the intelligent wearable device, and therefore a possibility of leakage of information in the terminal can be reduced.

20 Claims, 4 Drawing Sheets

(51) Int. Cl.
*H04M 3/16* (2006.01)
*G06F 1/16* (2006.01)
*G06F 1/3215* (2019.01)
*G06F 1/3231* (2019.01)

(58) Field of Classification Search
USPC ............... 455/456.4, 454, 41.2, 418, 39, 411
See application file for complete search history.

(56) References Cited

U.S. PATENT DOCUMENTS

| | | | | |
|---|---|---|---|---|
| 10,146,196 | B2* | 12/2018 | Medelius | G05D 23/1905 |
| 10,281,987 | B1* | 5/2019 | Yang | G06F 3/04847 |
| 2014/0173719 | A1 | 6/2014 | Wu | |
| 2014/0363797 | A1* | 12/2014 | Hu | G09B 19/0092 |
| | | | | 434/236 |
| 2016/0088241 | A1* | 3/2016 | Sung | H04N 5/2354 |
| | | | | 382/117 |
| 2016/0216130 | A1* | 7/2016 | Abramson | G01C 21/3423 |
| 2017/0279957 | A1* | 9/2017 | Abramson et al. | |
| | | | | H04M 1/6075 |
| 2018/0249000 | A1 | 8/2018 | Kim | |

FOREIGN PATENT DOCUMENTS

| | | |
|---|---|---|
| CN | 104915120 A | 9/2015 |
| CN | 105228084 A | 1/2016 |
| CN | 105323380 A | 2/2016 |
| CN | 105468267 A | 4/2016 |
| EP | 3059990 A1 | 8/2016 |
| WO | 2016131245 A1 | 8/2016 |

OTHER PUBLICATIONS

Machine Translation and Abstract of Chinese Publication No. CN105228084, Jan. 6, 2016, 31 pages.
Machine Translation and Abstract of International Publication No. WO2016131245, Aug. 25, 2016, 42 pages.
Foreign Communication From a Counterpart Application, PCT Application No. PCT/CN2017/099186, English Translation of International Search Report dated Nov. 1, 2017, 2 pages.
Machine Translation and Abstract of Chinese Publication No. CN103197839, Jul. 10, 2013, 19 pages.
Machine Translation and Abstract of Chinese Publication No. CN105468267, Apr. 6, 2016, 13 pages.
Foreign Communication From a Counterpart Application, Chinese Application No. 201610738550.2, Chinese Office Action dated Jun. 4, 2019, 14 pages.
Machine Translation and Abstract of Chinese Publication No. CN103885584, Jun. 25, 2014, 22 pages.

* cited by examiner

CONTROL METHOD FOR TERMINAL, TERMINAL, INTELLIGENT WEARABLE DEVICE, AND SYSTEM

CROSS-REFERENCE TO RELATED APPLICATIONS

This application is a U.S. National Stage of International Patent Application No. PCT/CV2017/0099186 filed on Aug. 25, 2017, which claims priority to Chinese Patent Application No. 201610738550.2 filed on Aug. 26, 2016. Both of the aforementioned applications are hereby incorporated by reference in their entireties.

TECHNICAL FIELD

The present invention relates to the field of electronic device control technologies, and in particular, to a control method for a terminal, a terminal, an intelligent wearable device, and a system.

BACKGROUND

With rapid development of science and technology, intelligent wearable devices such as wrist wearable intelligent devices are widely applied. The wrist wearable intelligent device refers to an intelligent device that can be fastened to a wrist of a user, for example, a smart band or a smartwatch.

Currently, diversified functions can be implemented through coordination and cooperation between an intelligent wearable device and a terminal (such as a mobile phone or a tablet computer). For example, currently a technical solution that a smart band is used to implement mobile phone unlocking appears. The technical solution is: a user binds a smart band to a mobile phone in advance; and after the user enters an unlocking instruction into the mobile phone, if the mobile phone can identify the bound smart band by using a Bluetooth module, the mobile phone performs an unlocking operation. Based on the foregoing technical solution, if the smart band and the mobile phone of the user are within a communications range of the Bluetooth module, the mobile phone performs the unlocking operation after the user enters the unlocking instruction into the mobile phone.

However, based on the foregoing technical solution, if the smart band and the mobile phone of the user are relatively close to each other, the mobile phone also performs an unlocking operation when another user enters an unlocking instruction into the mobile phone, consequently causing leakage of information in the mobile phone.

SUMMARY

In view of this, the present invention provides a terminal, an intelligent wearable device, a system, and a control method for a terminal, to reduce a possibility of leakage of information in the terminal while implementing terminal state switching through cooperation of the intelligent wearable device.

To achieve the objective above, technical solutions provided by the embodiments of the present invention are as follows:

According to an aspect, an embodiment of the present invention provides a control method for a terminal, where the terminal and an intelligent wearable device are in a bound state, and the control method includes:

in a lock screen state, when receiving a state switching instruction for the terminal, sending a motion data obtaining request to the intelligent wearable device; receiving first motion data that is of the intelligent wearable device within a predetermined time period and that is sent by the intelligent wearable device; obtaining second motion data of the terminal within the predetermined time period; calculating a deviation between the first motion data and the second motion data; and if the deviation is less than a deviation threshold, responding to the instruction, switching a state of the terminal.

After receiving the state switching instruction, the terminal calculates a deviation between motion data of this device and motion data of the intelligent wearable device within a predetermined time period. The terminal responds to the state switching instruction, to switch the state of the terminal, only when the deviation is less than a deviation threshold. A user usually wears the intelligent wearable device. When another person takes up the terminal of the user, the terminal and the intelligent wearable device are located on different persons. Therefore, there is a very large discrepancy between the motion data of the terminal and the motion data of the intelligent wearable device within a same time period, and even if another person enters a state switching instruction into the terminal, it is very difficult to trigger the terminal to perform state switching, so that a possibility of leakage of information in the terminal can be reduced.

In a possible design, the predetermined time period is before a first moment, a difference between an end moment of the predetermined time period and the first moment is less than or equal to a first time threshold, and the first moment is a moment at which the terminal receives the state switching instruction.

After receiving the state switching instruction, the terminal obtains motion data of this device and a smartwatch within the predetermined time period before the first moment, and determines, based on a deviation between the two groups of motion data, whether to perform state switching. In this way, after receiving the state switching instruction, the terminal can obtain as quickly as possible the motion data used for determining whether to perform state switching, and complete as quickly as possible a process of determining whether to perform state switching, thereby increasing a response speed of the terminal. In addition, the difference between the end moment of the predetermined time period and the first moment is set to be less than or equal to the first time threshold, so that a probability that the terminal responds, within a period after the user of the terminal puts down the terminal, to an operation by another user to perform state switching can be reduced, and the possibility of leakage of information in the terminal can be further reduced.

In a possible design, the predetermined time period is after a first moment, and a difference between a start moment of the predetermined time period and the first moment is less than or equal to a first time threshold.

After receiving the state switching instruction, the terminal obtains motion data of this device and the smartwatch within the predetermined time period after the first moment, and determines, based on a deviation between the two groups of motion data, whether to perform state switching. In this way, the terminal may instruct, only after receiving the state switching instruction, a motion sensor to be run for a period, thereby reducing power consumption of the terminal. Certainly, the intelligent wearable device may instruct, only after receiving the motion data obtaining request sent by the terminal, a motion sensor of the intelligent wearable device to be activated for a period, thereby reducing power consumption of the intelligent wearable device. In addition, the difference between the start moment of the predetermined time period and the first moment is set to be less than or equal to the first time threshold, so that after receiving the state switching instruction, the terminal can obtain as quickly as possible the motion data used for determining whether to perform state switching, and correspondingly complete as quickly as possible a process of determining whether to perform state switching, thereby increasing a response speed of the terminal.

In a possible design, the first time threshold is set to 0.

In a possible design, the first motion data includes an acceleration of the intelligent wearable device on a particular coordinate axis in a first three-dimensional coordinate system; and the second motion data is an acceleration of the terminal on the particular coordinate axis in a second three-dimensional coordinate system. Same coordinate axes of the first three-dimensional coordinate system and the second three-dimensional coordinate system have a same direction. That is, in the first three-dimensional coordinate system and the second three-dimensional coordinate system, X coordinate axes have a same direction, Y coordinate axes have a same direction, and Z coordinate axes have a same direction.

In a possible design, the calculating, by the terminal, a deviation between the first motion data and the second motion data includes:

separately sampling the first motion data and the second motion data at M sampling moments within the predetermined time period, to obtain M first sampled acceleration sets and M second sampled acceleration sets, where M is an integer greater than 1; separately calculating acceleration deviation amounts of the M sampling moments by using the M first sampled acceleration sets and the M second sampled acceleration sets, where an acceleration deviation amount of an $i^{th}$ sampling moment is calculated by using differences between sampled acceleration values on same coordinate axes in an $i^{th}$ first sampled acceleration set and an $i^{th}$ second sampled acceleration set, where i=1, 2, . . . , M; and calculating an average value of the acceleration deviation amounts of the M sampling moments, where the average value is the deviation between the first motion data and the second motion data.

The terminal separately samples the first motion data and the second motion data at the M sampling moments, to obtain the M first sampled acceleration sets and the M second sampled acceleration sets, separately calculates acceleration deviation amounts of the M sampling moments of the terminal and the intelligent wearable device by using the M first sampled acceleration sets and the M second sampled acceleration sets, and calculates an average value of the M acceleration deviation amounts. The average value can accurately reflect a difference between a motion state of the terminal and a motion state of the intelligent wearable device, and terminal running can be accurately controlled by using the average value as a basis on which the terminal determines whether to respond to the state switching instruction to perform state switching.

In a possible design, the calculating, by the terminal, an acceleration deviation amount of an $i^{th}$ sampling moment includes:

calculating the differences between the sampled acceleration values on the same coordinate axes in the $i^{th}$ first sampled acceleration set and the $i^{th}$ second sampled acceleration set; and calculating a sum of absolute values of the differences, where the sum is the acceleration deviation amount of the $i^{th}$ sampling moment.

In a possible design, the calculating, by the terminal, an acceleration deviation amount of an $i^{th}$ sampling moment includes:

calculating the differences between the sampled acceleration values on the same coordinate axes in the $i^{th}$ first sampled acceleration set and the $i^{th}$ second sampled acceleration set; and calculating a sum of squared values of the differences, where the sum is the acceleration deviation amount of the $i^{th}$ sampling moment.

In a possible design, the state switching instruction for the terminal includes: an unlocking instruction for the terminal and/or a screen-on instruction for the terminal.

In a possible design, after the responding to the unlocking instruction for the terminal, the method further includes:

determining motion amplitude of the terminal within the predetermined time period based on the second motion data; determining, by using a pre-stored mapping relationship between an amplitude interval and an operation mode, an operation mode corresponding to an amplitude interval to which the motion amplitude belongs; and controlling the terminal to enter the operation mode corresponding to the amplitude interval to which the motion amplitude belongs.

By holding the terminal by using a hand on which the intelligent wearable device is worn and moving the arm, the user can trigger the terminal to respond to the unlocking instruction for the terminal, to perform an unlocking operation. In addition, by adjusting motion amplitude of the arm within the predetermined time period to adjust the motion amplitude of the terminal, the user can trigger the terminal to enter, after the unlocking operation is performed, the operation mode corresponding to the amplitude interval to which the motion amplitude of the terminal belongs, so that the user conveniently and quickly controls the terminal to directly enter the corresponding operation mode.

According to another aspect, an embodiment of the present invention provides a terminal, where the terminal and an intelligent wearable device are in a bound state, and the terminal includes:

an input unit, configured to: in a lock screen state of the terminal, receive a state switching instruction for the terminal;

a processor, configured to respond to the instruction, to instruct a communications interface to send a motion data obtaining request to the intelligent wearable device and obtain first motion data of the intelligent wearable device within a predetermined time period, obtain second motion data of the terminal within the predetermined time period, calculate a deviation between the first motion data and the second motion data, and switch a state of the terminal if the deviation is less than a deviation threshold;

the communications interface, configured to respond to the instruction of the processor, to send the motion data obtaining request to the intelligent wearable device, and receive the first motion data that is of the intelligent wearable device within the predetermined time period and that is sent by the intelligent wearable device; and the motion sensor, configured to detect a motion state of the terminal, to obtain the second motion data of the terminal within the predetermined time period.

In a possible design, that the communications interface receives the first motion data that is of the intelligent wearable device within the predetermined time period and that is sent by the intelligent wearable device specifically includes: receiving, by the communications interface, an acceleration that is sent by the intelligent wearable device and that is of the intelligent wearable device within the predetermined time period on a particular coordinate axis in a first three-dimensional coordinate system; and that the motion sensor detects a motion state of the terminal, to obtain the second motion data of the terminal within the predetermined time period specifically includes: detecting, by the motion sensor, the motion state of the terminal, to obtain an acceleration of the terminal within the predetermined time period on the particular coordinate axis in a second three-dimensional coordinate system. Same coordinate axes of the first three-dimensional coordinate system and the second three-dimensional coordinate system have a same direction.

That is, the first motion data obtained by the processor of the terminal includes: the acceleration of the intelligent wearable device within the predetermined time period on the particular coordinate axis in the first three-dimensional coordinate system, and the second motion data obtained by the processor includes: the acceleration of the terminal within the predetermined time period on the particular coordinate axis in the second three-dimensional coordinate system.

In a possible design, that the processor of the terminal calculates a deviation between the first motion data and the second motion data specifically includes:

separately sampling, by the processor, the first motion data and the second motion data at M sampling moments within the predetermined time period, to obtain M first sampled acceleration sets and M second sampled acceleration sets, where M is an integer greater than 1; separately calculating acceleration deviation amounts of the M sampling moments by using the M first sampled acceleration sets and the M second sampled acceleration sets, where an acceleration deviation amount of an $i^{th}$ sampling moment is calculated by using differences between sampled acceleration values on same coordinate axes in an $i^{th}$ first sampled acceleration set and an $i^{th}$ second sampled acceleration set, where i=1, 2, . . . , M; and calculating an average value of the acceleration deviation amounts of the M sampling moments, where the average value is the deviation between the first motion data and the second motion data.

In a possible design, that the input unit of the terminal receives a state switching instruction for the terminal specifically includes: receiving, by the input unit, an unlocking instruction for the terminal and/or receiving a screen-on instruction for the terminal.

In a possible design, the processor of the terminal is further configured to: determine motion amplitude of the terminal within the predetermined time period based on the second motion data of the terminal within the predetermined time period; determine, by using a pre-stored mapping relationship between an amplitude interval and an operation mode, an operation mode corresponding to an amplitude interval to which the motion amplitude belongs; and control the terminal to enter the operation mode corresponding to the amplitude interval to which the motion amplitude belongs.

According to another aspect, an embodiment of the present invention provides an intelligent wearable device, where the intelligent wearable device and a terminal are in a bound state, and the intelligent wearable device includes:

a communications interface, configured to receive a motion data obtaining request sent by the terminal;

a processor, configured to respond to the motion data obtaining request, to obtain first motion data of the intelligent wearable device within a predetermined time period, and instruct the communications interface to send the first motion data to the terminal; and the motion sensor, configured to detect a motion state of the intelligent wearable device, to obtain the first motion data of the intelligent wearable device within the predetermined time period.

When receiving the motion data obtaining request sent by the terminal bound to the intelligent wearable device, the intelligent wearable device obtains the first motion data of this device within the predetermined time period, and sends the first motion data to the terminal, so that the terminal determines, by using the received first motion data and second motion data that is of the terminal within the predetermined time period, whether to perform state switching. The terminal responds to the state switching instruction, to perform state switching, only when a deviation between the first motion data and the second motion data is less than a deviation threshold, and therefore the intelligent wearable device can cooperate with the terminal to perform state switching, and a possibility of leakage of information in the terminal can be reduced.

In a possible design, the predetermined time period is before a first moment, a difference between an end moment of the predetermined time period and the first moment is less than or equal to a first time threshold, and the first moment is a moment at which the terminal receives the state switching instruction.

That the motion sensor of the intelligent wearable device detects a motion state of the intelligent wearable device, to obtain the first motion data of the intelligent wearable device within the predetermined time period specifically includes: detecting, by the motion sensor, the motion state of the intelligent wearable device, to obtain the second motion data of the intelligent wearable device within the predetermined time period before a first moment, where the first moment is a moment at which the terminal receives the state switching instruction for the terminal, and a difference between an end moment of the predetermined time period and the first moment is less than or equal to a first time threshold.

Based on the design, after receiving the state switching instruction, the terminal can obtain as quickly as possible the motion data used for determining whether to perform state switching, and complete as quickly as possible a process of determining whether to perform state switching, thereby increasing a response speed of the terminal. In addition, the difference between the end moment of the predetermined time period and the first moment is set to be less than or equal to the first time threshold, so that a probability that the terminal responds, within a period after the user of the terminal puts down the terminal, to an operation by another user to perform state switching can be reduced, and the possibility of leakage of information in the terminal can be further reduced.

In a possible design, the predetermined time period is after a first moment, and a difference between a start moment of the predetermined time period and the first moment is less than or equal to a first time threshold.

That the motion sensor of the intelligent wearable device detects a motion state of the intelligent wearable device, to obtain the first motion data of the intelligent wearable device within the predetermined time period specifically includes: detecting, by the motion sensor, the motion state of the intelligent wearable device, to obtain the second motion data of the intelligent wearable device within the predetermined time period after a first moment, where the first moment is a moment at which the terminal receives the state switching instruction for the terminal, and a difference between a start moment of the predetermined time period and the first moment is less than or equal to a first time threshold.

Based on the design, the terminal may instruct, only after receiving the state switching instruction, the motion sensor to be activated for a period, thereby reducing power consumption of the terminal. The intelligent wearable device may instruct, only after receiving the motion data obtaining request sent by the terminal, the motion sensor to be activated for a period, thereby reducing power consumption of the intelligent wearable device. In addition, the difference between the start moment of the predetermined time period and the first moment is set to be less than or equal to the first time threshold, so that after receiving the state switching instruction, the terminal can obtain as quickly as possible the motion data used for determining whether to perform state switching, and correspondingly complete as quickly as possible a process of determining whether to perform state switching, thereby increasing a response speed of the terminal.

According to another aspect, an embodiment of the present invention provides a system, including any terminal and intelligent wearable device in the foregoing, and the terminal and the intelligent wearable device are in a bound state.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely the embodiments of the present invention, and persons of ordinary skill in the art may still derive other drawings from these accompanying drawings without creative efforts.

DESCRIPTION OF EMBODIMENTS

Figure 1:
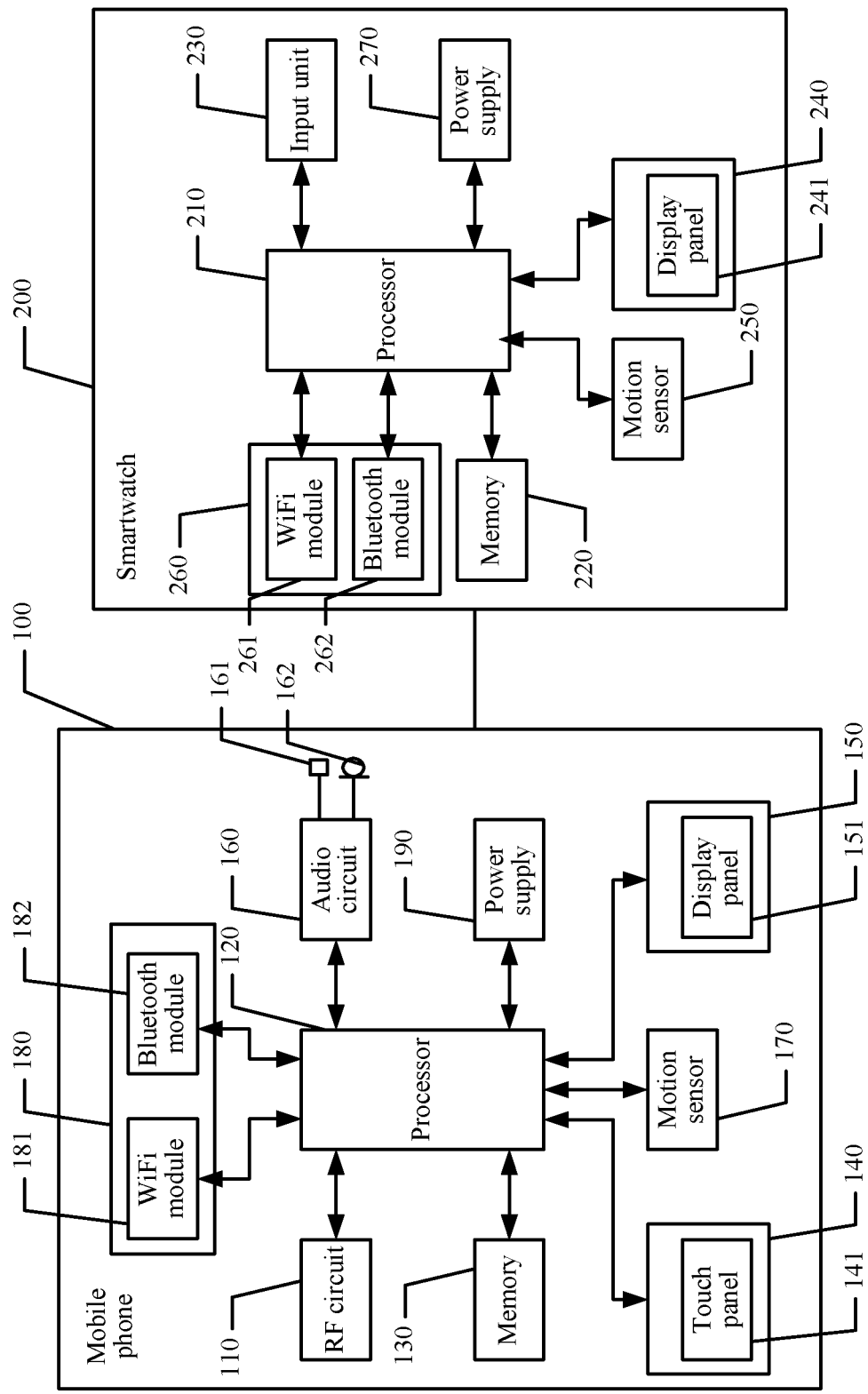
FIG. 1 is a structural block diagram of a mobile phone and a smartwatch according to an embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

The technical solutions disclosed in the embodiments of the present invention are applied to a terminal and an intelligent wearable device. The terminal may be a mobile phone, a tablet computer, an intelligent wearable device, a personal digital assistant (Personal Digital Assistant, PDA for short), a point of sales (Point of Sales, POS for short), or another electronic device that can be held by a user, and the terminal is equipped with a motion sensor that can record motion data of the terminal. The intelligent wearable device may be a wrist wearable intelligent wearable device, or may be an intelligent wearable device that can be worn on an upper limb of the user, for example, an intelligent wearable device that can be worn on a finger of the user. The intelligent wearable device is equipped with a motion sensor that can record motion data of the intelligent wearable device. The terminal and the intelligent wearable device in the embodiments of the present invention are in a bound state. That the terminal and the intelligent wearable device are in a bound state means: a pairing relationship is established between the terminal and the intelligent wearable device, and the terminal and the intelligent wearable device are connected to each other and can exchange data.

The embodiments of the present invention disclose a terminal and a control method for the terminal. The terminal is in a lock screen state, and when receiving a state switching instruction, the terminal sends a motion data obtaining request to an intelligent wearable device bound to the terminal, to obtain first motion data of the intelligent wearable device within a predetermined time period. The terminal further obtains second motion data of the terminal within the predetermined time period, and calculates a deviation between the first motion data and the second motion data. If the calculated deviation is less than a deviation threshold, the terminal responds to the instruction, to switch a state of the terminal.

After receiving the state switching instruction, the terminal calculates a deviation between motion data of this device and motion data of the intelligent wearable device within a predetermined time period. The terminal responds to the state switching instruction, to switch the state of the terminal, only when the deviation is less than a deviation threshold. The user usually wears the intelligent wearable device. When another person takes up the terminal of the user, the terminal and the intelligent wearable device are located on different persons. Therefore, there is a very large discrepancy between the motion data of the terminal and the motion data of the intelligent wearable device within a same time period, and even if another person enters a state switching instruction into the terminal, it is very difficult to trigger the terminal to perform state switching, so that a possibility of leakage of information in the terminal can be reduced. For the user of the terminal, when the user holds the terminal by using a hand on which the intelligent wearable device is worn, the intelligent wearable device and the terminal moves as an arm of the user moves, a motion state of the intelligent wearable device is similar to a motion state of the terminal have, and there is a very small deviation between the motion data of the two. It may be considered that the intelligent wearable device and the terminal are in a synchronized motion state. When the user enters a state switching instruction into the terminal, the terminal responds to the instruction, to switch from the lock screen state to another state.

The following describes application scenarios in the embodiments of the present invention by using an example in which the terminal is a mobile phone and the intelligent wearable device is a smartwatch. FIG. 1 is a block diagram of partial structures of a mobile phone 100 and a smartwatch 200 related to an embodiment of the present invention.

The mobile phone 100 and the smartwatch 200 shown in FIG. 1 are in a bound state, that is, a pairing relationship is established between the mobile phone 100 and the smartwatch 200, and the mobile phone 100 and the smartwatch 200 are connected to each other and can exchange data.

Referring to FIG. 1, the mobile phone 100 includes parts such as a radio frequency (Radio Frequency, RF) circuit 110, a processor 120, a memory 130, an input unit 140, a display unit 150, an audio circuit 160, a speaker 161, a microphone 162, a motion sensor 170, a wireless communications module 180, and a power supply 190. Persons skilled in the art may understand that a structure of the mobile phone shown in FIG. 1 does not constitute a limitation to the mobile phone, and the mobile phone may include more components or fewer components than those shown in the figure, or some components may be combined, or a different component deployment may be used.

The components of the mobile phone 100 are specifically described below with reference to FIG. 1.

The motion sensor 170 is configured to detect a motion state of the mobile phone 100, to obtain motion data of the mobile phone 100. An acceleration sensor may be used as the motion sensor 170, and the acceleration sensor may detect values of accelerations in various directions (generally on three axes of a three-dimensional spatial coordinate system), and may detect a magnitude and a direction of gravity when static. An acceleration value detected by the acceleration sensor may be used as the motion data of the mobile phone 100, and the processor 120 determines a motion state of the mobile phone 100 within a period according to the motion data.

The RF circuit 110 may be configured to receive and send information or receive and send a signal in a call process. In particular, after receiving downlink information from a base station, the RF circuit 110 transmits the downlink information to the processor 120 for processing. In addition, the RF circuit 110 sends uplink data to the base station. Usually, the RF circuit 110 includes, but is not limited to, an antenna, at least one amplifier, a transceiver, a coupler, a low noise amplifier (Low Noise Amplifier, LNA), a duplexer, and the like. In addition, the RF circuit 110 may also communicate with another device by using a wireless communications network. Wireless communication may use any communications standard or protocol, which includes, but is not limited to, Global System for Mobile Communications (Global System of Mobile communication, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short message service (Short Message Service, SMS), and the like.

The mobile phone 100 includes a wireless communications module 180, and the wireless communications module 180 includes but is not limited to a wireless fidelity (wireless fidelity, WiFi) module 181 and a Bluetooth module 182. WiFi is a short-distance wireless transmission technology, and the mobile phone 100 can exchange, by using a router or a hotspot, data with another device equipped with a WiFi module. Bluetooth is a short-distance wireless transmission technology, and the mobile phone 100 can exchange, by using the Bluetooth module 182, data with another device equipped with a Bluetooth module. The mobile phone 100 in this embodiment of the present invention can exchange data with the smartwatch 200 by using the wireless communications module 180.

The memory 130 is configured to store a software program and a module. The processor 120 runs the software program and the module stored in the memory 130, to perform various functional applications of the mobile phone 100 and data processing. The memory 130 mainly includes a program storage area and a data storage area, where the program storage area may store an operating system, an application program required by at least one function (such as a sound playback function and an image display function), and the like; and the data storage area may store data (such as audio data and a telephone directory) created based on use of the mobile phone 100, and the like. In addition, the memory 130 may include a high speed random access memory, and may further include a non-volatile memory, such as at least one magnetic disk storage device, a flash storage device, or another volatile solid-state storage device.

The processor 120 is a control center of the mobile phone 100, connects each part of the entire mobile phone 100 by using various interfaces and lines, and performs various functions of the mobile phone 100 and data processing by running or executing a software program and/or a module stored in the memory 130 and invoking data stored in the memory 130, thereby implementing a plurality of services that are based on the mobile phone. Optionally, the processor 120 may include one or more processing units. Preferably, the processor 120 may integrate an application processor and a modem processor. The application processor mainly processes an operating system, a user interface, an application program, and the like. The modem processor mainly processes wireless communication. It may be understood that the foregoing modem processor may alternatively not be integrated into the processor 120.

The processor 120 controls running of the motion sensor 170, and obtains motion data that is obtained by the motion sensor 170. The processor 120 can instruct the wireless communications module 180 and the RF circuit 110 to send data, and obtain data received by the wireless communications module 180 and the RF circuit 110. The mobile phone 100 is in a lock screen state, and the processor 120 responds to a state switching instruction for the mobile phone, to instruct an communications interface (the RF circuit 110, the WiFi module 181, or the Bluetooth module 182) to send a motion data obtaining request to the smartwatch 200, to obtain first motion data that is of the smartwatch 200 within a predetermined time period, received by the communications interface, and sent by the smartwatch 200, obtain second motion data of the mobile phone 100 within the predetermined time period, calculate a deviation between the first motion data and the second motion data, and switch a state of the mobile phone 100 if the deviation is less than a deviation threshold.

The input unit 140 is configured to: receive information (for example, a number, character information, and an instruction such as a state switching instruction for the terminal) that is entered, and generate a key signal input related to a user setting and function control of the mobile phone 100. Specifically, the input unit 140 may include a touch panel 141 and another input device. The touch panel 141, which is also referred to as a touchscreen, may collect a touch operation of a user on or near the touch panel (such as an operation of a user on or near the touch panel 141 by using any suitable object or accessory such as a finger or a stylus), and drive a corresponding connection apparatus based on a preset program.

Optionally, the touch panel 141 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 120. In addition, the touch controller can receive and execute a command sent from the processor 120.

In addition, the touch panel 141 may be a resistive, a capacitive, an infrared, or a surface sound wave type touch panel.

The input unit 140 may further include another input device in addition to the touch panel 141. Specifically, the another input device may include, but is not limited to: one or more of a physical keyboard, a functional key (such as a volume control key or a switch key), a trackball, a mouse, and a joystick.

The display unit 150 may be configured to display information entered by the user or information provided for the user by the mobile phone 100, and various menus of the mobile phone 100. The display unit 150 may include a display panel 151. Optionally, the display panel 151 may be configured by using an LCD (Liquid Crystal Display, liquid crystal display), an OLED (Organic Light-Emitting Diode, organic light-emitting diode), or the like. Further, the touch panel 141 may cover the display panel 151. After detecting a touch operation on or near the touch panel 141, the touch panel 141 transfers the touch operation to the processor 120, to determine a type of a touch event. The processor 120 then provides a corresponding visual output on the display panel 151 based on the type of the touch event. Although, in FIG. 1, the touch panel 141 and the display panel 151 are used as two separate components to implement input and output functions of the mobile phone 100, in some embodiments, the touch panel 141 and the display panel 151 may be integrated to implement the input and output functions of the mobile phone 100.

The audio circuit 160, the speaker 161, and the microphone 162 may provide an audio interface between the user and the mobile phone 100. The audio circuit 160 may convert audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the RF circuit 110, to send the audio data to another device (such as another mobile phone), or output the audio data to the memory 130 for further processing.

The mobile phone 100 further includes the power supply 190 (such as a battery) for supplying power to the components. Preferably, the power supply 190 may be logically connected to the processor 120 by using a power supply management system, so that functions such as charging and discharging management and power consumption control for the power supply 190 are implemented by using the power supply management system.

The mobile phone 100 may further include a part such as a camera. Details are not described herein.

Referring to FIG. 1, the smartwatch 200 includes parts such as a processor 210, a memory 220, an input unit 230, a display unit 240, a motion sensor 250, a wireless communications module 260, and a power supply 270. Persons skilled in the art may understand that a structure of the smartwatch shown in FIG. 1 does not constitute a limitation to the smartwatch, and the mobile phone may include more components or fewer components than those shown in the figure, or some components may be combined, or a different component deployment may be used.

The following specifically describes components of the smartwatch 200 with reference to FIG. 1.

The motion sensor 250 is configured to detect a motion state of the smartwatch 200, to obtain motion data of the smartwatch 200. An acceleration sensor may be used as the motion sensor 250. An acceleration value detected by the acceleration sensor may be used as the motion data of the smartwatch 200, and the processor 210 determines a motion state of the smartwatch 200 within a period according to the motion data.

The smartwatch 200 includes a wireless communications module 260, and the wireless communications module 260 includes but is not limited to a WiFi module 261 and a Bluetooth module 262. The smartwatch 200 can exchange, by using a router or a hotspot, data with another device equipped with a WiFi module. The smartwatch 200 can exchange, by using the Bluetooth module 262, data with another device equipped with a Bluetooth module. The smartwatch 200 in this embodiment of the present invention can exchange data with the mobile phone 100 by using the wireless communications module 260.

The smartwatch 200 may further include an RF module. The smartwatch 200 may exchange data with the mobile phone 100 by using an RF circuit.

The memory 220 is configured to store a software program and a module. The processor 210 runs the software program and the module stored in the memory 220, to perform various functional applications of the smartwatch 200 and data processing. The memory 220 may include a high speed random access memory, and may further include a non-volatile memory, such as at least one magnetic disk storage device, a flash storage device, or another volatile solid-state storage device.

The processor 210 is a control center of the smartwatch 200, connects each part of the entire smartwatch 200 by using various interfaces and lines, and performs various functions of the smartwatch 200 and data processing by running or executing a software program and/or a module stored in the memory 220 and invoking data stored in the memory 220. Optionally, the processor 210 may include one or more processing units.

The processor 210 controls running of the motion sensor 250, and obtains motion data that is obtained by the motion sensor 250. The processor 250 can instruct the wireless communications module 260 to send data, and obtain data received by the wireless communications module 260. If an RF circuit is disposed in the smartwatch, the processor 250 can instruct the RF circuit to send data, and obtain data received by the RF circuit. The processor 250 responds to a motion data obtaining request received by an communications interface (the WiFi module 261, the Bluetooth module 262, or the RF module) and sent by the mobile phone 100, to obtain first motion data of the smartwatch 200 within a predetermined time period, and instruct the communications interface of the smartwatch 200 to send the first motion data to the mobile phone 100.

The input unit 230 is configured to: receive information that is entered, and generate a key signal input related to a user setting and function control of the smartwatch 200. Specifically, the input unit 230 may include a touch panel and another input device, and the another input device may include but is not limited to one or more of a physical keyboard, a function key (such as a volume control key or a switch key), a joystick, and the like. In some smartwatches, only the physical keyboard and the function key may be disposed, and the touch panel may be not disposed, to reduce device costs.

The display unit 240 may be configured to display information entered by the user or information provided for the user by the smartwatch 200, and various menus of the smartwatch 200. The display unit 240 may include a display panel 241. Optionally, the display panel 241 may be configured by using an LCD, an OLED, or the like. Further, the touch panel may cover the display panel 241. After detecting a touch operation on or near the touch panel, the touch panel transfers the touch operation to the processor 210, to determine a type of a touch event. The processor 210 then provides a corresponding visual output on the display panel 240 based on the type of the touch event. In some embodiments, the touch panel and the display panel 241 may be integrated to implement input and output functions of the smartwatch 200.

The smartwatch 200 further includes the power supply 270 (such as a battery) for supplying power to the components. Preferably, the power supply 270 may be logically connected to the processor 210 by using a power supply management system, so that functions such as charging and discharging management and power consumption control for the power supply 270 are implemented by using the power supply management system.

Figure 2:
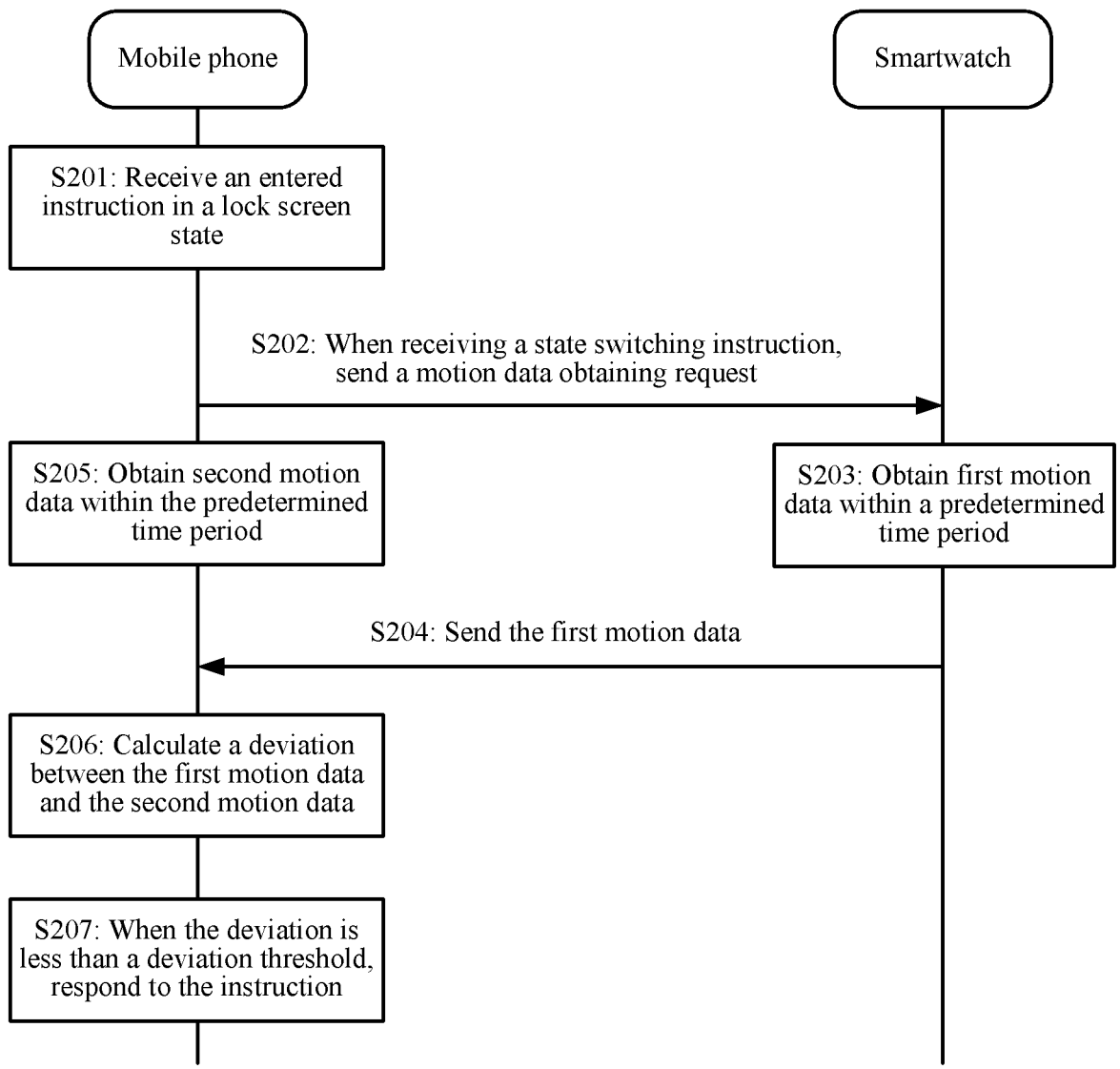
FIG. 2 is a flowchart of a control method applied to the mobile phone and the smartwatch shown in FIG. 1 according to an embodiment of the present invention.

The following describes, in detail with reference to FIG. 2, a control method disclosed in the present invention. FIG. 2 is a flowchart of a control method applied to the mobile phone and the smartwatch shown in FIG. 1 according to an embodiment of the present invention, including the following steps.

Step S201: The mobile phone receives an entered instruction in a lock screen state.

When the mobile phone is in the lock screen state, a user may enter the instruction by using a touch panel, may enter the instruction by using another input device, such as a physical keyboard or a function key, or may enter the instruction in a voice form by using a microphone. When the mobile phone is in the lock screen state, the entered instruction includes but is not limited to: a control instruction for some application, for example, an instruction used for adjusting an output volume of an audio player, or an instruction for controlling an audio player to play another file; or a state switching instruction for the mobile phone, for example, an unlocking instruction for the mobile phone and a screen-on instruction for the mobile phone.

Herein, it should be noted that, instructing the mobile phone to light up the screen is different from instructing the mobile phone to be unlocked. When a display unit of the mobile phone is lighted up but the mobile phone is not unlocked, the display unit displays some data, for example, displays time information, date information, a call notification, a received instant message, or notification information for a received instant message, but the user cannot directly operate the data displayed on a display screen.

Step S202: When receiving a state switching instruction, the mobile phone sends a motion data obtaining request to the smartwatch.

After receiving the entered instruction, a processor of the mobile phone determines whether the instruction is the state switching instruction for the mobile phone. When receiving the state switching instruction for the mobile phone (for example, the unlocking instruction or the screen-on instruction), the processor of the mobile phone instructs a communications interface to send a request to the smartwatch in a bound state. The request is used for instructing the smartwatch to obtain motion data of the smartwatch within a predetermined time period, and feed back the obtained motion data to the mobile phone. The request carries a time parameter, and the smartwatch responds to the request, to obtain first motion data of the smartwatch within a time period represented by the time parameter. For the convenience of description, the motion data of the smartwatch is recorded as the first motion data.

Step S203: The smartwatch obtains first motion data of the smartwatch within a predetermined time period.

The smartwatch is equipped with a motor sensor, and instructed by a processor of the smartwatch, the motion sensor detects a motion state of the smartwatch, to obtain the motion data of the smartwatch. The processor of the smartwatch obtains the first motion data of the smartwatch within the predetermined time period.

Step S204: The smartwatch sends the first motion data to the mobile phone.

The mobile phone and the smartwatch may exchange data by using Bluetooth modules. Alternatively, the mobile phone accesses a router or a hotspot by using a WiFi module, and the smartwatch accesses a router or a hotspot by using a WiFi module, to exchange data. Alternatively, when the smartwatch is equipped with an RF module, the mobile phone and the smartwatch access a base station by using respective RF modules, to exchange data.

Step S205: The mobile phone obtains second motion data of the mobile phone within the predetermined time period.

The mobile phone is equipped with a motion sensor, and instructed by a processor of the mobile phone, the motion sensor detects a motion state of the mobile phone, to obtain the motion data of the mobile phone. When or after receiving the state switching instruction, or when or after instructing the communications interface to send the motion data obtaining request to the smartwatch, the processor of the mobile phone obtains the second motion data of the mobile phone within the predetermined time period. For the convenience of description, the motion data of the mobile phone is recorded as the second motion data.

In this embodiment of the present invention, the first motion data includes an acceleration of the smartwatch on a particular coordinate axis in a first three-dimensional coordinate system; and the second motion data includes an acceleration of the mobile phone on the particular coordinate axis in a second three-dimensional coordinate system. Same coordinate axes of the first three-dimensional coordinate system and the second three-dimensional coordinate system have a same direction. That is, in the first three-dimensional coordinate system and the second three-dimensional coordinate system, X coordinate axes have a same direction, Y coordinate axes have a same direction, and Z coordinate axes have a same direction.

As an example, the particular coordinate axis is a first coordinate axis, the first coordinate axis is any one of an X coordinate axis, a Y coordinate axis, and a Z coordinate axis. As another example, the particular coordinate axis is a first coordinate axis and a second coordinate axis, and the first coordinate axis and the second coordinate axis are any two of an X coordinate axis, a Y coordinate axis, and a Z coordinate axis. As another example, the particular coordinate axis is an X coordinate axis, a Y coordinate axis, and a Z coordinate axis.

For example, the first motion data includes an acceleration of the smartwatch on an X coordinate axis in a first three-dimensional coordinate system; and the second motion data includes an acceleration of the mobile phone on an X coordinate axis in a second three-dimensional coordinate system. For example, the first motion data includes accelerations of the smartwatch on an X coordinate axis and a Y coordinate axis in a first three-dimensional coordinate system; and the second motion data includes accelerations of the mobile phone on an X coordinate axis and a Y coordinate axis in a second three-dimensional coordinate system. For example, the first motion data includes accelerations of the smartwatch on an X coordinate axis, a Y coordinate axis, and a Z coordinate axis in a first three-dimensional coordinate system; and the second motion data includes accelerations of the mobile phone on an X coordinate axis, a Y coordinate axis, and a Z coordinate axis in a second three-dimensional coordinate system.

In the embodiments disclosed in the present invention, the first three-dimensional coordinate system and the second three-dimensional coordinate system may be world coordinate systems or user coordinate systems. As an example, the first three-dimensional coordinate system and the second three-dimensional coordinate system in the embodiments of the present invention are defined as follows: a positive direction of an X axis is pointing rightward from an origin of coordinates, a positive direction of a Y axis is pointing downward from the origin of coordinates, and a positive direction of a Z axis is pointing from the origin of coordinates toward an outer side of a plane constituted by the X axis and the Y axis, that is, a direction away from the user.

Step S206: The mobile phone calculates a deviation between the first motion data and the second motion data within the predetermined time period.

The processor of the mobile phone obtains the first motion data received by a wireless communications module or the RF module, obtains the second motion data obtained by the motion sensor of the mobile phone, and calculates a deviation amount between the first motion data and a second motion data.

That the processor of the mobile phone calculates a deviation between the first motion data and the second motion data within the predetermined time period includes:

1. Separately sample the first motion data and the second motion data at M sampling moments within the predetermined time period, to obtain M first sampled acceleration sets and M second sampled acceleration sets, where M is an integer greater than 1.

2. Calculate acceleration deviation amounts of the M sampling moments by using the M first sampled acceleration sets and the M second sampled acceleration sets. An acceleration deviation amount of an $i^{th}$ sampling moment is calculated by using differences between sampled acceleration values on same coordinate axes in an $i^{th}$ first sampled acceleration set and an $i^{th}$ second sampled acceleration set, where i=1, 2, . . . , M.

3. Calculate an average value of the acceleration deviation amounts of the M sampling moments, where the average value is the deviation between the first motion data and the second motion data.

A manner of calculating the acceleration deviation amount of the $i^{th}$ sampling moment is: calculating the differences between the sampled acceleration values on the same coordinate axes in the $i^{th}$ first sampled acceleration set and the $i^{th}$ second sampled acceleration set; and calculating a sum of absolute values of the differences, where the sum is the acceleration deviation amount of the $i^{th}$ sampling moment.

Another manner of calculating the acceleration deviation amount of the $i^{th}$ sampling moment is: calculating the differences between the sampled acceleration values on the same coordinate axes in the $i^{th}$ first sampled acceleration set and the $i^{th}$ second sampled acceleration set; and calculating a sum of squared values of the differences, where the sum is the acceleration deviation amount of the $i^{th}$ sampling moment.

Step S207: When the deviation is less than a deviation threshold, the mobile phone responds to the instruction, to switch a state of the terminal.

After the processor of the mobile phone calculates the deviation between the first motion data and the second motion data, if the calculated deviation is less than the deviation threshold, the processor of the mobile phone responds to the state switching instruction, to switch the lock screen state of the mobile phone to a state indicated by the instruction.

When a hand, on which the smartwatch is worn, of a user holds the mobile phone, the motion state of the smartwatch is similar to the motion state of the mobile phone, a deviation between the motion data of the two is relatively small, and it may be considered that the two synchronously move. If another person takes up the mobile phone of the user, the deviation between the motion data of the mobile phone and the motion data of the smartwatch is relatively large. Therefore, if the deviation between the motion data of the mobile phone and the motion data of the smartwatch within the predetermined time period is less than the deviation threshold, it may be determined that the state switching instruction received by the mobile phone is generated by the user of the mobile phone by performing an operation, the mobile phone responds to the instruction, and the state is switched. If the deviation between the motion data of the mobile phone and the motion data of the smartwatch within the predetermined time period is greater than or equal to the deviation threshold, it may be determined that the state switching instruction received by the mobile phone is generated by another person by performing an operation, the mobile phone does not respond to the instruction, thereby preventing information in the mobile phone from being leaked to another person.

In this embodiment of the present invention, the state switching instruction for the mobile phone includes the unlocking instruction for the mobile phone or the screen-on instruction for the mobile phone.

If the mobile phone receives the unlocking instruction for the mobile phone, when determining that the deviation is less than the deviation threshold, the mobile phone responds to the unlocking instruction, to perform an unlocking operation, and the mobile phone enters an unlocked state after being unlocked, where the unlocked state may also be referred to as a regular operating state. If the mobile phone receives the screen-on instruction for the mobile phone, when determining that the deviation is less than the deviation threshold, the mobile phone responds to the screen-on instruction, to light up the display screen.

As an example, in this embodiment of the present invention, the first motion data is accelerations of the smartwatch on a first coordinate axis and a second coordinate axis in a first three-dimensional coordinate system; and the second motion data is accelerations of the mobile phone on a first coordinate axis and a second coordinate axis in a second three-dimensional coordinate system. The first three-dimensional coordinate system and second three-dimensional coordinate system include the X coordinate axis, the Y coordinate axis, and the Z coordinate axis, and the first coordinate axis and the second coordinate axis are any two coordinate axes of the X coordinate axis, the Y coordinate axis, and the Z coordinate axis.

In this example, that the processor of the mobile phone calculates a deviation between the first motion data and the second motion data within the predetermined time period is specifically:

1. Separately sample the first motion data and the second motion data at M sampling moments within the predetermined time period, to obtain M first sampled acceleration sets and M second sampled acceleration sets.

The first motion data is sampled at the M sampling moments, to obtain the M first sampled acceleration sets, and the second motion data is sampled at the M sampling moment, to obtain the M second sampled acceleration sets, where M is an integer greater than 1. The $i^{th}$ first sampled acceleration set is obtained by sampling the first motion data at the $i^{th}$ sampling moment, and includes: sampled acceleration values, of the $i^{th}$ sampling moment, of the smartwatch on the first coordinate axis and the second coordinate axis. The $i^{th}$ second sampled acceleration set is obtained by sampling the second motion data at the $i^{th}$ sampling moment, and includes: sampled acceleration values, of the $i^{th}$ sampling moment, of the mobile phone on the first coordinate axis and the second coordinate axis, where i=1, 2, . . . , M.

2. Separately calculate acceleration deviation amounts of the M sampling moments by using the M first sampled acceleration sets and the M second sampled acceleration sets. The acceleration deviation amount of the $i^{th}$ sampling moment is calculated by using a difference between sampled acceleration values on the first coordinate axes and a difference between sampled acceleration values on the second coordinate axes in the $i^{th}$ first sampled acceleration set and the $i^{th}$ second sampled acceleration set.

3. Calculate an average value of the acceleration deviation amounts of the M sampling moments, where the average value is the deviation between the first motion data and the second motion data.

During implementation, the processor of the mobile phone may calculate an acceleration deviation amount of any sampling moment of the M sampling moments in a plurality of manners.

A manner of calculating the acceleration deviation amount of the $i^{th}$ sampling moment is: calculating the difference between the sampled acceleration values on the first coordinate axes in the $i^{th}$ first sampled acceleration set and the $i^{th}$ second sampled acceleration set, where the difference is recorded as a first difference; calculating the difference between the sampled acceleration values on the second coordinate axes in the $i^{th}$ first sampled acceleration set and the $i^{th}$ second sampled acceleration set, where the difference is recorded as a second difference; and calculating a sum of an absolute value of the first difference and an absolute value of the second difference, where the sum is used as the acceleration deviation amount of the $i^{th}$ sampling moment.

Another manner in which the processor of the mobile phone calculates the acceleration deviation amount of the $i^{th}$ sampling moment is: calculating the difference between the sampled acceleration values on the first coordinate axes in the $i^{th}$ first sampled acceleration set and the $i^{th}$ second sampled acceleration set, where the difference is recorded as a first difference; calculating the difference between the sampled acceleration values on the second coordinate axes in the $i^{th}$ first sampled acceleration set and the $i^{th}$ second sampled acceleration set, where the difference is recorded as a second difference; and calculating a sum of a squared value of the first difference and a squared value of the second difference, where the sum is used as the acceleration deviation amount of the $i^{th}$ sampling moment.

That is, the first difference between the sampled acceleration value on the first coordinate axis in the $i^{th}$ first sampled acceleration set and the sampled acceleration value on the first coordinate axis in the $i^{th}$ second sampled acceleration set is calculated; the second difference between the sampled acceleration value on the second coordinate axis in the $i^{th}$ first sampled acceleration set and the sampled acceleration value on the second coordinate axis in the $i^{th}$ second sampled acceleration set is calculated; and the sum of the absolute value of the first difference and the absolute value of the second difference is calculated, or the sum of the squared value of the first difference and the squared value of the second difference is calculated, where the sum is used as the acceleration deviation amount of the $i^{th}$ sampling moment.

As an example, in this embodiment of the present invention, the first motion data is accelerations of the smartwatch on three coordinate axes in a first three-dimensional coordinate system; and the second motion data is accelerations of the mobile phone on three coordinate axes in a second three-dimensional coordinate system.

In this example, that the processor of the mobile phone calculates the deviation between the first motion data and the second motion data is specifically:

1. Separately sample the first motion data and the second motion data at M sampling moments within the predetermined time period, to obtain M first sampled acceleration sets and M second sampled acceleration sets.

The first motion data is sampled at the M sampling moments, to obtain the M first sampled acceleration sets, and the second motion data is sampled at the M sampling moments, to obtain the M second sampled acceleration sets, where M is an integer greater than 1. The $i^{th}$ first sampled acceleration set is obtained by sampling the first motion data at the $i^{th}$ sampling moment, and includes: sampled acceleration values, of the $i^{th}$ sampling moment, of the smartwatch on the X coordinate axis, the Y coordinate axis, and the Z coordinate axis. The $i^{th}$ second sampled acceleration set is obtained by sampling the second motion data at the $i^{th}$ sampling moment, and includes: sampled acceleration values, of the $i^{th}$ sampling moment, of the mobile phone on the X coordinate axis, the Y coordinate axis, and the Z coordinate axis, where i=1, 2, . . . , M.

2. Separately calculate acceleration deviation amounts of the M sampling moments by using the M first sampled acceleration sets and the M second sampled acceleration sets. The acceleration deviation amount of the $i^{th}$ sampling moment is calculated by using a difference between sampled acceleration values on the X coordinate axes, a difference between sampled acceleration values on the Y coordinate axes, and a difference between sampled acceleration values on the Z coordinate axes in the $i^{th}$ first sampled acceleration set and the $i^{th}$ second sampled acceleration set.

3. Calculate an average value of the acceleration deviation amounts of the M sampling moments, where the average value is the deviation between the first motion data and the second motion data.

During implementation, the processor of the mobile phone may calculate an acceleration deviation amount of any sampling moment of the M sampling moments in a plurality of manners.

A manner in which the processor of the mobile phone calculates the acceleration deviation amount of the $i^{th}$ sampling moment: calculating a difference between the sampled acceleration values on the X coordinate axes in the $i^{th}$ first sampled acceleration set and the $i^{th}$ second sampled acceleration set, where the difference is recorded as a third difference; calculating a difference between the sampled acceleration values on the Y coordinate axes in the $i^{th}$ first sampled acceleration set and the $i^{th}$ second sampled acceleration set, where the difference is recorded as a fourth difference; calculating a difference between the sampled acceleration values on the Z coordinate axes in the $i^{th}$ first sampled acceleration set and the $i^{th}$ second sampled acceleration set, where the difference is recorded as a fifth difference; and calculating a sum of an absolute value of the third difference, an absolute value of the fourth difference, and an absolute value of the fifth difference, where the sum is used as the acceleration deviation amount of the $i^{th}$ sampling moment.

For example, accelerations, of eight moments within a predetermined time period, on an X axis, a Y axis, and a Z axis are sampled for the mobile phone and the smartwatch, and a sampling result is shown in Table 1.

fifth difference is calculated, where the sum is used as the acceleration deviation amount of the $i^{th}$ sampling moment.

As an example, in this embodiment of the present invention, the first motion data includes an acceleration of the smartwatch on a first coordinate axis in a first three-dimensional coordinate system; and the second motion data includes an acceleration of the mobile phone on a first coordinate axis in a second three-dimensional coordinate system. The first three-dimensional coordinate system and

TABLE 1

|  |  | Sampling moment 1 | Sampling moment 2 | Sampling moment 3 | Sampling moment 4 | Sampling moment 5 | Sampling moment 6 | Sampling moment 7 | Sampling moment 8 |
|---|---|---|---|---|---|---|---|---|---|
| Mobile phone (m/s$^2$) | Acceleration on the X axis | 0.23 | 0.26 | 0.42 | 0.65 | 0.74 | 0.85 | 0.91 | 0.91 |
|  | Acceleration on the Y axis | 0.65 | 2.21 | 3.75 | 4.54 | 4.91 | 5.94 | 6.65 | 6.76 |
|  | Acceleration on the Z axis | 9.86 | 9.56 | 9.16 | 8.75 | 8.56 | 7.86 | 7.32 | 7.17 |
| Smartwatch (m/s$^2$) | Acceleration on the X axis | 0.26 | 0.21 | 0.42 | 0.61 | 0.79 | 0.89 | 0.95 | 0.93 |
|  | Acceleration on the Y axis | 0.63 | 2.22 | 3.73 | 4.51 | 4.93 | 5.91 | 6.63 | 6.75 |
|  | Acceleration on the Z axis | 9.9 | 9.54 | 9.19 | 8.71 | 8.55 | 7.81 | 7.33 | 7.16 |

Acceleration deviation amounts of the sampling moment 1 to the sampling moment 8 for the smartwatch and the mobile phone are successively: 0.09, 0.08, 0.05, 0.11, 0.08, 0.12, 0.07, and 0.04.

Another manner in which the processor of the mobile phone calculates the acceleration deviation amount of the $i^{th}$ sampling moment: calculating a difference between the sampled acceleration values on the X coordinate axes in the $i^{th}$ first sampled acceleration set and the $i^{th}$ second sampled acceleration set, where the difference is recorded as a third difference; calculating a difference between the sampled acceleration values on the Y coordinate axes in the $i^{th}$ first sampled acceleration set and the $i^{th}$ second sampled acceleration set, where the difference is recorded as a fourth difference; calculating a difference between the sampled acceleration values on the Z coordinate axes in the $i^{th}$ first sampled acceleration set and the $i^{th}$ second sampled acceleration set, where the difference is recorded as a fifth difference; and calculating a sum of a squared value of the third difference, a squared value of the fourth difference, and a squared value of the fifth difference, where the sum is used as the acceleration deviation amount of the $i^{th}$ sampling moment.

That is, the third difference between the sampled acceleration value on the X coordinate axis in the $i^{th}$ first sampled acceleration set and the sampled acceleration value on the X coordinate axis in the $i^{th}$ second sampled acceleration set is calculated; the fourth difference between the sampled acceleration value on the Y coordinate axis in the $i^{th}$ first sampled acceleration set and the sampled acceleration value on the Y coordinate axis in the $i^{th}$ second sampled acceleration set is calculated; the fifth difference between the sampled acceleration value on the Z coordinate axis in the $i^{th}$ first sampled acceleration set and the sampled acceleration value on the Z coordinate axis in the $i^{th}$ second sampled acceleration set is calculated; the sum of the absolute value of the third difference, the absolute value of the fourth difference, and the absolute value of the fifth difference is calculated, or the sum of the squared value of the third difference, the squared value of the fourth difference, and the squared value of the second three-dimensional coordinate system include the X coordinate axis, the Y coordinate axis, and the Z coordinate axis, and the first coordinate axis is any coordinate axis of the X coordinate axis, the Y coordinate axis, and the Z coordinate axis.

The following further describes embodiments of the present invention with reference to more accompanying drawings.

Figure 3:
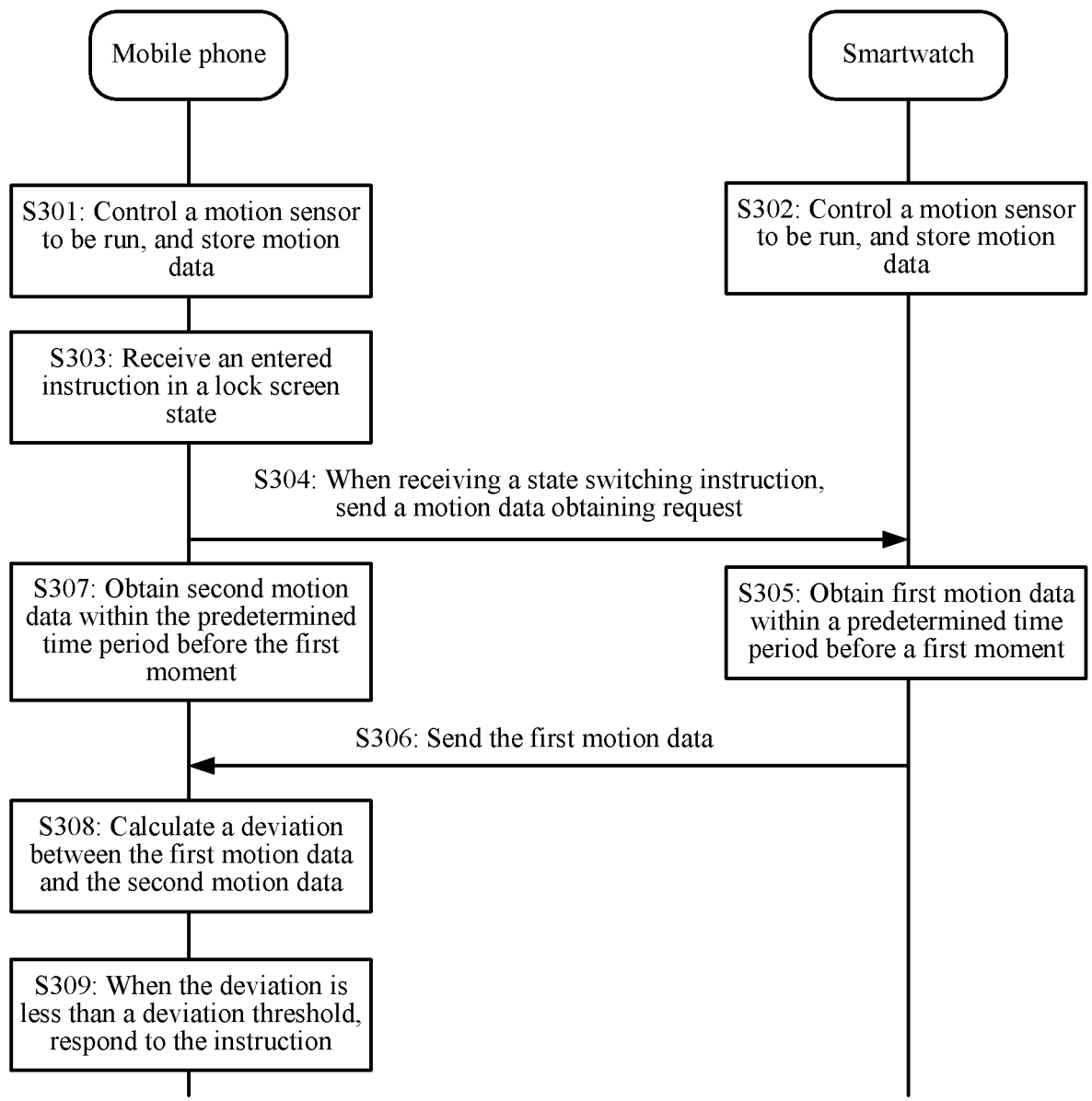
FIG. 3 is a flowchart of another control method applied to the mobile phone and the smartwatch shown in FIG. 1 according to an embodiment of the present invention.

FIG. 3 is a flowchart of another control method applied to the mobile phone and the smartwatch shown in FIG. 1 according to an embodiment of the present invention, including the following steps.

Step S301: The mobile phone controls an internal motion sensor to be in a running state, and stores motion data generated by the motion sensor.

The mobile phone is equipped with a motion sensor, a processor of the mobile phone instructs the motion sensor to be in the running state, the motion sensor detects a motion state of the mobile phone to obtain the motion data of the mobile phone, and a memory of the mobile phone stores the motion data obtained by the motion sensor.

Step S302: The smartwatch controls an internal motion sensor to be in the running state, and stores motion data generated by the motion sensor.

The smartwatch is equipped with a motion sensor, a processor of the smartwatch instructs the motion sensor to be in the running state, the motion sensor detects a motion state of the smartwatch to obtain the motion data of the smartwatch, and a memory of the smartwatch stores the motion data obtained by the motion sensor.

Step S303: The mobile phone receives an entered instruction in a lock screen state.

Step S304: When receiving a state switching instruction, the mobile phone sends a motion data obtaining request to the smartwatch.

After receiving the entered instruction, a processor of the mobile phone determines whether the instruction is the state switching instruction for the mobile phone. When receiving the state switching instruction for the mobile phone, the processor of the mobile phone instructs a communications interface to send a request to the smartwatch in a bound state. The request is used for instructing the smartwatch to send motion data within a predetermined time period. The predetermined time period is before a first moment, and a difference between an end moment of the predetermined time period and the first moment is less than or equal to a first time threshold. The first moment is a moment at which the mobile phone receives the state switching instruction for the mobile phone. The request carries a time parameter, and the time parameter represents a time period before the first moment. The smartwatch responds to the request, to obtain first motion data of the smartwatch within the time period represented by the time parameter.

Step S305: The smartwatch obtains first motion data of the smartwatch within a predetermined time period before a first moment.

Step S306: The smartwatch sends the first motion data to the mobile phone.

The motion sensor of the smartwatch is in the running state, and can detect the motion state of the smartwatch to obtain the motion data of the smartwatch. The motion data is stored in the memory of the smartwatch. The processor of the smartwatch responds to the request sent by the mobile phone, to obtain the first motion data within the predetermined time period before the first moment from the motion data stored in the memory, and instructs a communications interface of the smartwatch to send the obtained first motion data to the mobile phone. The mobile phone and the smartwatch exchange data with each other by using respective wireless communications modules or RF circuits. For a specific exchange manner, refer to the description in the foregoing.

Step S307: The mobile phone obtains second motion data of the mobile phone within the predetermined time period before the first moment.

The motion sensor of the mobile phone is in the running state, and can detect the motion state of the mobile phone to obtain the motion data of the mobile phone. The motion data is stored in the memory of the mobile phone. When or after receiving the state switching instruction for the mobile phone, or when or after instructing the communications interface to send the motion data obtaining request to the smartwatch, the processor of the mobile phone obtains the second motion data within the predetermined time period before the first moment from the motion data stored in the memory.

Step S308: The mobile phone calculates a deviation between the first motion data and the second motion data within the predetermined time period.

In the control method shown in FIG. 3, for data included in the first motion data and the second motion data, and a manner in which the processor of the mobile phone calculates the deviation between the first motion data and the second motion data, refer to the description in the foregoing.

Step S309: When the deviation is less than a deviation threshold, the mobile phone responds to the instruction, to switch from the lock screen state to a state indicated by the instruction.

According to the control method shown in FIG. 3, the motion sensor of the mobile phone is in the running state, and detects the motion state of the mobile phone to obtain the motion data of the mobile phone. The motion data is stored in the memory of the mobile phone. The motion sensor of the smartwatch is in the running state, and detects the motion state of the smartwatch to obtain the motion data of the smartwatch. The motion data is stored in the memory of the smartwatch. After receiving the state switching instruction, the mobile phone obtains the second motion data of this device within the predetermined time period before the first moment from the motion data stored in the internal memory, and receives the first motion data sent by the smartwatch. The first motion data is obtained by the smartwatch from the motion data stored in the internal memory, and the mobile phone determines, based on a deviation between the two groups of motion data, whether to respond to the instruction, to perform state switching. In this way, after receiving the state switching instruction, the mobile phone can obtain as quickly as possible the motion data used for determining whether to respond to the instruction, to perform state switching, and complete as quickly as possible a process of determining whether to respond to the instruction to perform state switching, thereby increasing a response speed of the mobile phone. In addition, the difference between the end moment of the predetermined time period and the first moment is set to be less than or equal to the first time threshold, so that a probability that the terminal responds, within a period after the user of the terminal puts down the terminal, to an operation by another user to perform state switching can be reduced, and the possibility of leakage of information in the terminal can be further reduced.

In the control method shown in FIG. 3, as a preferred implementation, the first time threshold may be set to 0.

Figure 4:
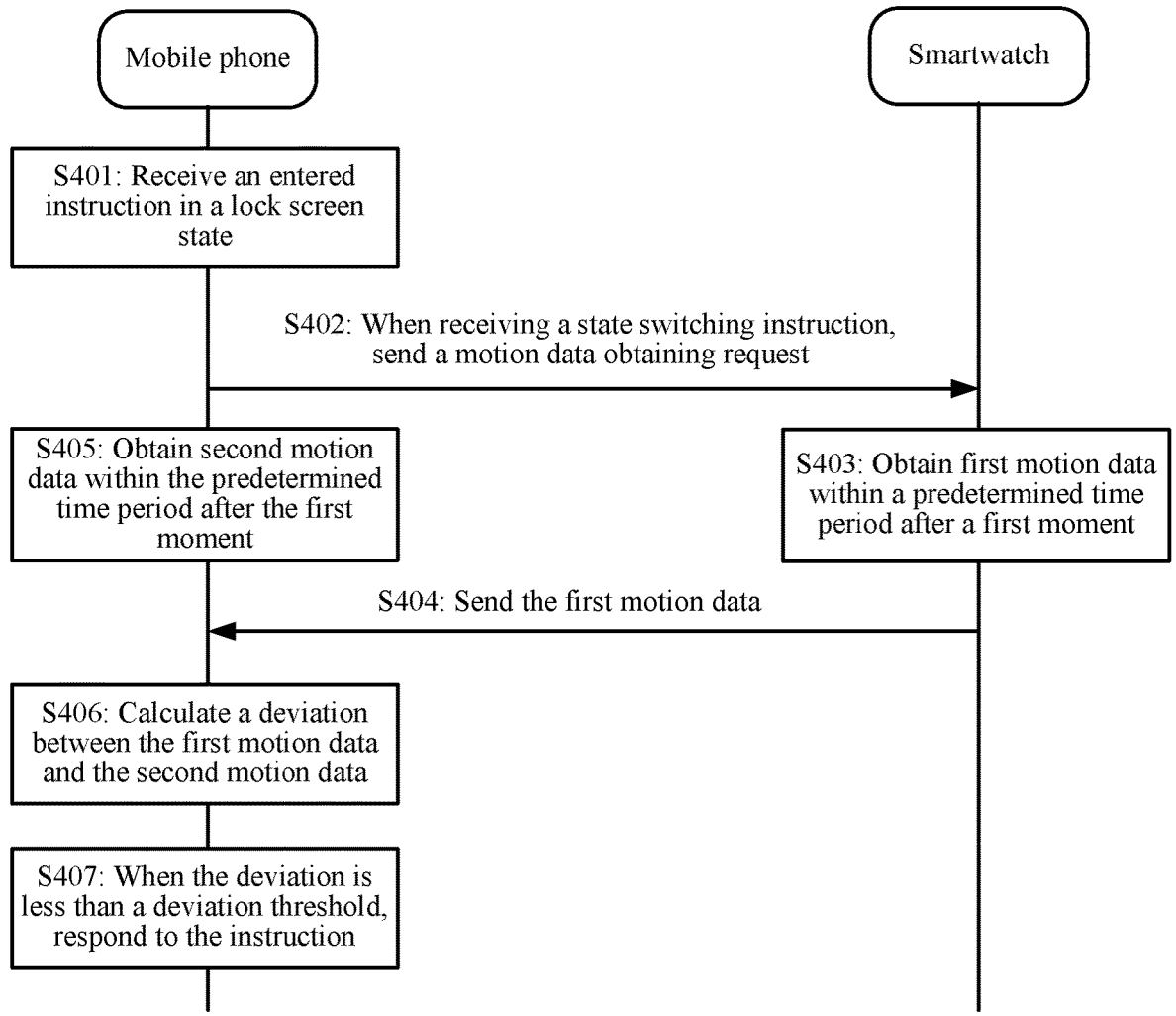
FIG. 4 is a flowchart of another control method applied to the mobile phone and the smartwatch shown in FIG. 1 according to an embodiment of the present invention.

FIG. 4 is a flowchart of another control method applied to the mobile phone and the smartwatch shown in FIG. 1 according to an embodiment of the present invention, including the following steps.

Step S401: The mobile phone receives an entered instruction in a lock screen state.

Step S402: When receiving a state switching instruction, the mobile phone sends a motion data obtaining request to the smartwatch.

After receiving the entered instruction, a processor of the mobile phone determines whether the instruction is the state switching instruction for the mobile phone. When receiving the state switching instruction for the mobile phone, the processor of the mobile phone instructs a communications interface to send a request to the smartwatch in a bound state. The request is used for instructing the smartwatch to send motion data within a predetermined time period. The predetermined time period is after a first moment, and a difference between a start moment of the predetermined time period and the first moment is less than or equal to a first time threshold. The first moment is a moment at which the mobile phone receives the state switching instruction for the mobile phone. The request carries a time parameter, and the time parameter represents a time period after the first moment. The smartwatch responds to the request, to obtain motion data of the smartwatch within the time period represented by the time parameter.

Step S403: The smartwatch obtains first motion data of the smartwatch within a predetermined time period after a first moment.

Step S404: The smartwatch sends the first motion data to the mobile phone.

Instructed by the processor of the smartwatch, the motion sensor of the smartwatch detects the motion state of the smartwatch to obtain the motion data of the smartwatch. The motion data is stored in the memory of the smartwatch. The processor of the smartwatch responds to the request sent by the mobile phone, to obtain the first motion data within the predetermined time period after the first moment from the memory or directly from the motion sensor, and instructs a communications interface of the smartwatch to send the first motion data to the mobile phone. The mobile phone and the smartwatch exchange data with each other by using respective wireless communications modules or RF circuits. For a specific exchange manner, refer to the description in the foregoing.

Step S405: The mobile phone obtains second motion data of the mobile phone within the predetermined time period after the first moment.

Herein, it should be noted that, if the motion sensor of the mobile phone is in a running state, the processor of the mobile phone may obtain the second motion data of the mobile phone within the predetermined time period after the first moment.

In addition, to reduce power consumption of the mobile phone, the motion sensor of the mobile phone may be set to be in an off state by default. When receiving the state switching instruction, the processor of the mobile phone instructs the motion sensor of the mobile phone to be run, so that the motion sensor detects, within the predetermined time period after the first moment, a motion state of the mobile phone, to obtain the second motion data. After a running time of the motion sensor reaches predetermined duration, the processor of the mobile phone controls the motion sensor to be turned off.

Step S406: The mobile phone calculates a deviation between the first motion data and the second motion data within the predetermined time period.

In the control method shown in FIG. 4, for data included in the first motion data and the second motion data, and a manner in which the processor of the mobile phone calculates the deviation between the first motion data and the second motion data, refer to the description in the foregoing.

Step S407: When the deviation is less than a deviation threshold, the mobile phone responds to the instruction, to switch from the lock screen state to a state indicated by the instruction.

After receiving the state switching instruction, the mobile phone obtains motion data of this device and a smartwatch within the predetermined time period after the first moment, and determines, based on a deviation between the two groups of motion data, whether to perform state switching. In this way, the mobile phone may instruct, only after receiving the state switching instruction, the motion sensor of the mobile phone to be activated for a period, thereby reducing the power consumption of the mobile phone. Certainly, the smartwatch may instruct, only when receiving the motion data obtaining request sent by the mobile phone, a motion sensor of the smartwatch to be activated for a period, thereby reducing power consumption of the smartwatch. In addition, the difference between the start moment of the predetermined time period and the first moment is set to be less than or equal to the first time threshold, so that after receiving the state switching instruction, the terminal can obtain as quickly as possible the motion data used for determining whether to perform state switching, and correspondingly complete as quickly as possible a process of determining whether to perform state switching, thereby increasing a response speed of the terminal.

In the control method shown in FIG. 4, as a preferred implementation, the first time threshold may be set to 0.

Optionally, in the embodiments disclosed in the present invention, after the mobile phone responds to an unlocking instruction, the method further includes: determining motion amplitude of the mobile phone within the predetermined time period based on the second motion data of the mobile phone within the predetermined time period; determining, by using a pre-stored mapping relationship between an amplitude interval and an operation mode, an operation mode corresponding to an amplitude interval to which the motion amplitude belongs; and controlling the mobile phone to enter the operation mode corresponding to the amplitude interval to which the motion amplitude belongs.

A memory of the mobile phone stores the mapping relationship between the amplitude interval and the operation mode, amplitude intervals do not overlap, and different amplitude intervals correspond to different operation modes. The operation mode of the mobile phone includes but is not limited to a work mode, a learning mode, a leisure mode, a guest mode, and a power saving mode.

For a user of the mobile phone, by holding the mobile phone by using a hand on which the smartwatch is worn and moving the arm, the user can trigger the mobile phone to respond to the unlocking instruction, to perform an unlocking operation. In addition, by adjusting motion amplitude of the arm within the predetermined time period to adjust the motion amplitude of the mobile phone, the user can trigger the mobile phone to enter, after the unlocking operation is performed, the operation mode corresponding to the amplitude interval to which the motion amplitude of the mobile phone belongs, so that the user conveniently and quickly controls the mobile phone to directly enter the corresponding operation mode.

Optionally, in the embodiments disclosed in the present invention, after the mobile phone responds to an unlocking instruction, the method further includes: determining shift of the mobile phone within the predetermined time period based on the second motion data of the mobile phone within the predetermined time period; determining, by using a pre-stored mapping relationship between a shift interval and an operation mode, an operation mode corresponding to a shift interval to which the shift belongs; and controlling the mobile phone to enter the operation mode corresponding to the shift interval to which the shift belongs.

A memory of the mobile phone stores the mapping relationship between the shift interval and the operation mode, shift intervals do not overlap, and different shift intervals correspond to different operation modes.

For a user of the mobile phone, by holding the mobile phone by using a hand on which the smartwatch is worn and moving the arm, the user can trigger the mobile phone to respond to the unlocking instruction, to perform an unlocking operation. In addition, by adjusting shift of the arm within the predetermined time period to adjust the shift of the mobile phone, the user can trigger the mobile phone to enter, after the unlocking operation is performed, the operation mode corresponding to the shift interval to which the shift of the mobile phone belongs, so that the user conveniently and quickly controls the mobile phone to directly enter the corresponding operation mode.

It should be noted that, in this embodiment of the present invention, the control method applied to the terminal and the intelligent wearable device is described by using the mobile phone and the smartwatch shown in FIG. 1 as an example. Persons skilled in the art may directly apply the control method to another terminal and intelligent wearable device.

An embodiment of the present invention further provides a terminal. The terminal includes: an input unit, a motion sensor, a communications interface, and a processor. Refer to the structure of the mobile phone 100 in FIG. 1.

The input unit is configured to: in a lock screen state of the terminal, receive a state switching instruction for the terminal.

The processor is configured to respond to the state switching instruction for the terminal, to instruct a communications interface to send a motion data obtaining request to the intelligent wearable device and obtain first motion data of the intelligent wearable device within a predetermined time period, obtain second motion data of the terminal within the predetermined time period, calculate a deviation between the first motion data and the second motion data within the predetermined time period, and switch a state of the terminal if the deviation is less than a deviation threshold.

The communications interface is configured to respond to the instruction of the processor, to send the motion data obtaining request to the intelligent wearable device, and receive the first motion data that is of the intelligent wearable device within the predetermined time period and that is sent by the intelligent wearable device.

The motion sensor is configured to detect a motion state of the terminal, to obtain the second motion data of the terminal within the predetermined time period.

As an example, the predetermined time period is before a first moment, and a difference between an end moment of the predetermined time period and the first moment is less than or equal to a first time threshold. The first moment is a moment at which the terminal receives the state switching instruction for the terminal.

That the motion sensor of the terminal detects a motion state of the terminal, to obtain the second motion data of the terminal within the predetermined time period specifically includes: detecting, by the motion sensor, the motion state of the terminal, to obtain the second motion data of the terminal within the predetermined time period before a first moment, where the difference between the end moment of the predetermined time period and the first moment is less than or equal to the first time threshold.

That the processor of the terminal instructs the communications interface to send a motion data obtaining request to the intelligent wearable device specifically includes: instructing, by the processor, the communications interface to send, to the intelligent wearable device, a request for obtaining motion data of the intelligent wearable device within the predetermined time period before the first moment, where the difference between the end moment of the predetermined time period and the first moment is less than or equal to the first time threshold.

As an example, the predetermined time period is after a first moment, and a difference between a start moment of the predetermined time period and the first moment is less than or equal to a first time threshold.

That the motion sensor of the terminal detects a motion state of the terminal, to obtain the second motion data of the terminal within the predetermined time period specifically includes: detecting, by the motion sensor, the motion state of the terminal, to obtain the second motion data of the terminal within the predetermined time period after a first moment, where the difference between the start moment of the predetermined time period and the first moment is less than or equal to the first time threshold.

That the processor of the terminal instructs the communications interface to send a motion data obtaining request to the intelligent wearable device specifically includes: instructing, by the processor, the communications interface to send, to the intelligent wearable device, a request for obtaining motion data of the intelligent wearable device within the predetermined time period after the first moment, where the difference between the start moment of the predetermined time period and the first moment is less than or equal to the first time threshold.

Preferably, the first time threshold is set to 0.

As an example, the first motion data obtained by the processor of the terminal includes an acceleration of the intelligent wearable device on a particular coordinate axis in a first three-dimensional coordinate system, and the second motion data obtained by the processor of the terminal includes an acceleration of the terminal on the particular coordinate axis in a second three-dimensional coordinate system. Same coordinates of the first three-dimensional coordinate system and the second three-dimensional coordinate system have a same direction.

That the communications interface of the terminal receives the first motion data that is of the intelligent wearable device within the predetermined time period and that is sent by the intelligent wearable device specifically includes: receiving, by the communications interface, an acceleration that is sent by the intelligent wearable device and that is of the intelligent wearable device within the predetermined time period on a particular coordinate axis in a first three-dimensional coordinate system.

That the motion sensor of the terminal detects a motion state of the terminal, to obtain the second motion data of the terminal within the predetermined time period specifically includes: detecting, by the motion sensor, the motion state of the terminal, to obtain an acceleration of the terminal within the predetermined time period on the particular coordinate axis in a second three-dimensional coordinate system.

As an example, that the processor of the terminal calculates the deviation between the first motion data and the second motion data specifically includes:

separately sampling, by the processor, the first motion data and the second motion data at M sampling moments within the predetermined time period, to obtain M first sampled acceleration sets and M second sampled acceleration sets, where M is an integer greater than 1; separately calculating acceleration deviation amounts of the M sampling moments by using the M first sampled acceleration sets and the M second sampled acceleration sets, where an acceleration deviation amount of an $i^{th}$ sampling moment is calculated by using differences between sampled acceleration values on same coordinate axes in an $i^{th}$ first sampled acceleration set and an $i^{th}$ second sampled acceleration set, where i=1, 2, . . . , M; and calculating an average value of the acceleration deviation amounts of the M sampling moments, where the average value is the deviation between the first motion data and the second motion data. For a process in which the processor calculates an acceleration deviation amount of each sampling moment, refer to the description in the foregoing.

Optionally, the processor of the terminal is further configured to: determine motion amplitude of the terminal within the predetermined time period based on the second motion data of the terminal within the predetermined time period; determine, by using a pre-stored mapping relationship between an amplitude interval and an operation mode, an operation mode corresponding to an amplitude interval to which the motion amplitude belongs; and control the terminal to enter the operation mode corresponding to the amplitude interval to which the motion amplitude belongs.

Optionally, the processor of the terminal is further configured to: determine shift of the terminal within the predetermined time period based on the second motion data of the terminal within the predetermined time period; determine, by using a pre-stored mapping relationship between a shift interval and an operation mode, an operation mode corresponding to a shift interval to which the shift belongs; and control the terminal to enter the operation mode corresponding to the shift interval to which the shift belongs.

An embodiment of the present invention further provides an intelligent wearable device. The intelligent wearable device includes: a motion sensor, a communications interface, and a processor. Refer to the structure of the smartwatch in FIG. 1.

The communications interface is configured to receive a motion data obtaining request sent by the terminal.

The processor is configured to respond to the motion data obtaining request, to obtain first motion data of the intelligent wearable device within a predetermined time period, and instruct the communications interface to send the first motion data to the terminal.

The motion sensor is configured to detect a motion state of the intelligent wearable device, to obtain the first motion data of the intelligent wearable device within the predetermined time period.

When receiving the motion data obtaining request sent by the terminal bound to the intelligent wearable device, the intelligent wearable device obtains the first motion data of this device within the predetermined time period, and sends the obtained first motion data to the terminal, so that the terminal determines, by using the received first motion data and second motion data that is of the terminal within the predetermined time period, whether to perform state switching. The terminal responds to the state switching instruction, to perform state switching, only when a deviation between the first motion data and the second motion data is less than a deviation threshold, and therefore the intelligent wearable device can cooperate with the terminal to perform state switching, and a possibility of leakage of information in the terminal can be reduced.

As an example, that the motion sensor of the intelligent wearable device detects a motion state of the intelligent wearable device, to obtain the second motion data of the intelligent wearable device within the predetermined time period specifically includes: detecting, by the motion sensor, the motion state of the intelligent wearable device, to obtain the second motion data of the intelligent wearable device within the predetermined time period before a first moment, where a difference between an end moment of the predetermined time period and the first moment is less than or equal to a first time threshold.

As an example, that the motion sensor of the intelligent wearable device detects a motion state of the intelligent wearable device, to obtain the second motion data of the intelligent wearable device within the predetermined time period specifically includes: detecting, by the motion sensor, the motion state of the intelligent wearable device, to obtain the second motion data of the intelligent wearable device within the predetermined time period after a first moment, where a difference between a start moment of the predetermined time period and the first moment is less than or equal to a first time threshold.

An embodiment of the present invention further discloses a system. The system includes the foregoing terminal and intelligent wearable device. The terminal and the intelligent wearable device are in a bound state. For structures and functions of the terminal and the intelligent wearable device in this system, refer to the descriptions in the foregoing.

In the foregoing embodiments of the present invention, the descriptions about the terminal, the intelligent wearable device, and the system are relatively simple. For functions of the terminal, the intelligent wearable device, and the system, refer to related descriptions about the control method.

What is claimed is:

1. A control method for a terminal, comprising:
   receiving a state switching instruction for the terminal indicating to switch state in a lock screen state, wherein the state switching instruction for the terminal comprises an unlocking instruction for the terminal or a screen-on instruction for the terminal;
   sending a motion data obtaining request to an intelligent wearable device, wherein the terminal and the intelligent wearable device are in a bound state;
   receiving first motion data of the intelligent wearable device within a predetermined time period from the intelligent wearable device, wherein the first motion data comprises a first set of acceleration values of the intelligent wearable device;
   obtaining second motion data of the terminal within the predetermined time period, wherein the second motion data comprises a second set of acceleration values of the terminal;
   calculating a deviation between the first motion data and the second motion data;
   switching the state of the terminal responding to the state switching instruction when the deviation is less than a deviation threshold;
   determining motion amplitude of the terminal within the predetermined time period based on the second motion data;
   determining, using a pre-stored mapping relationship between an amplitude interval and an operation mode, the operation mode corresponding to the amplitude interval to which the motion amplitude belongs; and
   controlling the terminal to enter the operation mode corresponding to the amplitude interval to which the motion amplitude belongs.

2. The control method of claim 1, wherein the predetermined time period comprises before a first moment, a difference between an end moment of the predetermined time period and the first moment is less than or equal to a first time threshold, and wherein the first moment comprises a moment at which the terminal receives the state switching instruction for the terminal.

3. The control method of claim 1, wherein the predetermined time period comprises after a first moment, a difference between a start moment of the predetermined time period and the first moment is less than or equal to a first time threshold, and wherein the first moment comprises a moment at which the terminal receives the state switching instruction for the terminal.

4. The control method of claim 1, wherein the first motion data comprises an acceleration of the intelligent wearable device on a particular coordinate axis in a first three-dimensional coordinate system, wherein the second motion data comprises an acceleration of the terminal on the same particular coordinate axis in a second three-dimensional coordinate system, and wherein same coordinate axes of the first three-dimensional coordinate system and the second three-dimensional coordinate system have a same direction.

5. The control method of claim 4, wherein calculating the deviation between the first motion data and the second motion data comprises:
   separately sampling the first motion data and the second motion data at M sampling moments within the predetermined time period to obtain M first sampled acceleration sets and M second sampled acceleration sets, wherein M comprises an integer greater than one;
   separately calculating acceleration deviation amounts of the M sampling moments using the M first sampled acceleration sets and the M second sampled acceleration sets, wherein an acceleration deviation amount of an $i^{th}$ sampling moment is calculated using differences between sampled acceleration values on same coordinate axes in an $i^{th}$ first sampled acceleration set and an $i^{th}$ second sampled acceleration set, and wherein i=1, 2, . . . , M; and calculating an average value of the acceleration deviation amounts of the M sampling moments, wherein the average value comprises the deviation between the first motion data and the second motion data.

6. The control method of claim 5, wherein calculating the acceleration deviation amount of the $i^{th}$ sampling moment comprises:

calculating the differences between the sampled acceleration values on the same coordinate axes in the $i^{th}$ first sampled acceleration set and the $i^{th}$ second sampled acceleration set; and calculating a sum of absolute values of the differences, wherein the sum comprises the acceleration deviation amount of the $i^{th}$ sampling moment.

7. The control method of claim 5, wherein calculating the acceleration deviation amount of the $i^{th}$ sampling moment comprises:

calculating the differences between the sampled acceleration values on the same coordinate axes in the $i^{th}$ first sampled acceleration set and the $i^{th}$ second sampled acceleration set; and calculating a sum of squared values of the differences, wherein the sum comprises the acceleration deviation amount of the $i^{th}$ sampling moment.

8. The control method of claim 1, wherein the first set of acceleration values and the second set of acceleration values comprise a magnitude and a direction.

9. A terminal, in a bound state with an intelligent wearable device, comprising:

an input circuit configured to receive, in a lock screen state of the terminal, a state switching instruction indicating the terminal to switch state, wherein the state switching instruction for the terminal comprises an unlocking instruction for the terminal or a screen-on instruction for the terminal;

a processor coupled to the input circuit and configured to:
send, using a communications interface, a motion data obtaining request to the intelligent wearable device;
receive, using the communications interface, first motion data of the intelligent wearable device within a predetermined time period, wherein the first motion data comprises a first set of acceleration values of the intelligent wearable device;
detect, using a motion sensor, a motion state of the terminal to obtain second motion data of the terminal within the predetermined time period, wherein the second motion data comprises a second set of acceleration values of the terminal;
calculate a deviation between the first motion data and the second motion data;
switch a state of the terminal when the deviation is less than a deviation threshold;
determine motion amplitude of the terminal within the predetermined time period based on the second motion data;
determine, using a pre-stored mapping relationship between an amplitude interval and an operation mode, the operation mode corresponding to the amplitude interval to which the motion amplitude belongs; and control the terminal to enter the operation mode corresponding to the amplitude interval to which the motion amplitude belongs.

10. The terminal of claim 9, wherein in response to detecting the motion state of the terminal, the processor is further configured to detect, using the motion sensor, the motion state of the terminal to obtain the second motion data of the terminal within the predetermined time period before a first moment, wherein the first moment comprises a moment at which the terminal receives the state switching instruction for the terminal, wherein a difference between an end moment of the predetermined time period and the first moment is less than or equal to a first time threshold, and wherein in response to sending the motion data obtaining request to the intelligent wearable device, the processor is further configured to send, using the communications interface to the intelligent wearable device, a request for obtaining motion data of the intelligent wearable device within the predetermined time period before the first moment.

11. The terminal of claim 9, wherein in response to detecting the motion state of the terminal, the processor is further configured to detect, using the motion sensor, the motion state of the terminal to obtain the second motion data of the terminal within the predetermined time period after a first moment, wherein the first moment comprises a moment at which the terminal receives the state switching instruction for the terminal, wherein a difference between a start moment of the predetermined time period and the first moment is less than or equal to a first time threshold, and wherein in response to sending the motion data obtaining request to the intelligent wearable device, the processor is further configured to send, using the communications interface to the intelligent wearable device, a request for obtaining motion data of the intelligent wearable device within the predetermined time period after the first moment.

12. The terminal of claim 9, wherein in response to receiving the first motion data of the intelligent wearable device within the predetermined time period, the processor is further configured to receive, from the intelligent wearable device using the communications interface, an acceleration of the intelligent wearable device within the predetermined time period on a particular coordinate axis in a first three-dimensional coordinate system, wherein in response to detecting the motion state of the terminal, the processor is further configured to detect, using the motion sensor, the motion state of the terminal to obtain an acceleration of the terminal within the predetermined time period on the same particular coordinate axis in a second three-dimensional coordinate system, and wherein same coordinate axes of the first three-dimensional coordinate system and the second three-dimensional coordinate system have a same direction.

13. The terminal of claim 12, wherein in response to calculating the deviation between the first motion data and the second motion data, the processor is further configured to:

separately sample the first motion data and the second motion data at M sampling moments within the predetermined time period to obtain M first sampled acceleration sets and M second sampled acceleration sets, wherein M comprises an integer greater than one;

separately calculate acceleration deviation amounts of the M sampling moments using the M first sampled acceleration sets and the M second sampled acceleration sets, wherein an acceleration deviation amount of an $i^{th}$ sampling moment is calculated using differences between sampled acceleration values on same coordinate axes in an $i^{th}$ first sampled acceleration set and an $i^{th}$ second sampled acceleration set, and wherein i=1, 2, . . . , M; and calculate an average value of the acceleration deviation amounts of the M sampling moments, wherein the average value comprises the deviation between the first motion data and the second motion data.

14. A computer program product comprising instructions stored on a non-transitory computer-readable medium that, when executed by a processor, cause a terminal to:
receive a state switching instruction for the terminal indicating to switch state in a lock screen state, wherein the state switching instruction for the terminal comprises an unlocking instruction for the terminal or a screen-on instruction for the terminal;
send a motion data obtaining request to an intelligent wearable device, wherein the terminal and the intelligent wearable device are in a bound state;
receive first motion data of the intelligent wearable device within a predetermined time period from the intelligent wearable device, wherein the first motion data comprises a first set of acceleration values of the intelligent wearable device;
obtain second motion data of the terminal within the predetermined time period, wherein the second motion data comprises a second set of acceleration values of the terminal;
calculate a deviation between the first motion data and the second motion data;
switch the state of the terminal responding to the state switching instruction when the deviation is less than a deviation threshold;
determine motion amplitude of the terminal within the predetermined time period based on the second motion data;
determine, using a pre-stored mapping relationship between an amplitude interval and an operation mode, the operation mode corresponding to the amplitude interval to which the motion amplitude belongs; and
control the terminal to enter the operation mode corresponding to the amplitude interval to which the motion amplitude belongs.

15. The computer program product of claim 14, wherein the predetermined time period comprises before a first moment, a difference between an end moment of the predetermined time period and the first moment is less than or equal to a first time threshold, and wherein the first moment comprises a moment at which the terminal receives the state switching instruction for the terminal.

16. The computer program product of claim 14, wherein the predetermined time period comprises after a first moment, a difference between a start moment of the predetermined time period and the first moment is less than or equal to a first time threshold, and wherein the first moment comprises a moment at which the terminal receives the state switching instruction for the terminal.

17. The computer program product of claim 14, wherein the first motion data comprises an acceleration of the intelligent wearable device on a particular coordinate axis in a first three-dimensional coordinate system, wherein the second motion data comprises an acceleration of the terminal on the same particular coordinate axis in a second three-dimensional coordinate system, and wherein same coordinate axes of the first three-dimensional coordinate system and the second three-dimensional coordinate system have a same direction.

18. The computer program product of claim 17, wherein the instructions further cause the terminal to calculate the deviation between the first motion data and the second motion data by:
separately sampling the first motion data and the second motion data at M sampling moments within the predetermined time period to obtain M first sampled acceleration sets and M second sampled acceleration sets, wherein M comprises an integer greater than one;
separately calculating acceleration deviation amounts of the M sampling moments using the M first sampled acceleration sets and the M second sampled acceleration sets, wherein an acceleration deviation amount of an $i^{th}$ sampling moment is calculated using differences between sampled acceleration values on same coordinate axes in an $i^{th}$ first sampled acceleration set and an $i^{th}$ second sampled acceleration set, and wherein i=1, 2, . . . , M; and
calculating an average value of the acceleration deviation amounts of the M sampling moments, wherein the average value comprises the deviation between the first motion data and the second motion data.

19. The computer program product of claim 18, wherein the instructions further cause the terminal to calculate the acceleration deviation amount of the $i^{th}$ sampling moment by:
calculating the differences between the sampled acceleration values on the same coordinate axes in the $i^{th}$ first sampled acceleration set and the $i^{th}$ second sampled acceleration set; and
calculating a sum of absolute values of the differences, wherein the sum comprises the acceleration deviation amount of the $i^{th}$ sampling moment.

20. The computer program product of claim 18, wherein the instructions further cause the terminal to calculate the acceleration deviation amount of the $i^{th}$ sampling moment by:
calculating the differences between the sampled acceleration values on the same coordinate axes in the $i^{th}$ first sampled acceleration set and the $i^{th}$ second sampled acceleration set; and
calculating a sum of squared values of the differences, wherein the sum comprises the acceleration deviation amount of the $i^{th}$ sampling moment.

* * * * *

UNITED STATES PATENT AND TRADEMARK OFFICE
CERTIFICATE OF CORRECTION

Page 1 of 1

PATENT NO. : 11,003,224 B2
APPLICATION NO. : 16/097130
DATED : May 11, 2021
INVENTOR(S) : Baicai Wang et al.

It is certified that error appears in the above-identified patent and that said Letters Patent is hereby corrected as shown below:

On the Title Page

(71) Applicant: "Huawei Technologies Co., Ltd." should read "Honor Device Co., Ltd."

(73) Assignee: "Huawei Technologies Co., Ltd." should read "Honor Device Co., Ltd."

(57) Abstract, Line 5: "predetermined lime period of" should read "predetermined time period of"

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*